United States Patent
Duan et al.

(10) Patent No.: US 8,456,835 B2
(45) Date of Patent: Jun. 4, 2013

(54) ELASTIC MODULE AND SLIDE MECHANISM AND ELECTRONIC DEVICE USING THE SAME

(75) Inventors: Chao Duan, Shenzhen (CN); Chia-Hua Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 124 days.

(21) Appl. No.: 13/095,016

(22) Filed: Apr. 27, 2011

(65) Prior Publication Data

US 2012/0182672 A1 Jul. 19, 2012

(30) Foreign Application Priority Data

Jan. 14, 2011 (CN) .......................... 2011 1 0007759

(51) Int. Cl.
*H05K 5/00* (2006.01)
*H05K 7/00* (2006.01)
*H04M 1/00* (2006.01)

(52) U.S. Cl.
USPC ............ 361/679.56; 361/379.27; 361/679.29; 455/575.4

(58) Field of Classification Search
USPC ............. 361/679.01, 679.02, 679.08, 679.09, 361/679.3, 679.55–679.59, 756–759; 455/575.1, 455/575.3, 575.4, 575.8
See application file for complete search history.

(56) References Cited

U.S. PATENT DOCUMENTS

2011/0045879 A1* 2/2011 Kim et al. ................. 455/575.4

* cited by examiner

*Primary Examiner* — Zachary M Pape
*Assistant Examiner* — Jerry Wu
(74) *Attorney, Agent, or Firm* — Altis Law Group, Inc.

(57) ABSTRACT

An elastic module for a portable electronic device includes at least one elastic element. The at least one elastic element is an integral type element forming a plurality of linear springs and including two connecting ends. The springs are substantially arranged on a plane and are converged with the connecting ends.

5 Claims, 5 Drawing Sheets

ELASTIC MODULE AND SLIDE MECHANISM AND ELECTRONIC DEVICE USING THE SAME

BACKGROUND

1. Technical Field

The disclosure relates to an elastic module, a slide mechanism using the elastic module, and an electronic device using the slide mechanism.

2. Description of Related Art

Many slide-type portable electronic devices have a cover, a housing, and a slide mechanism connecting the cover to the housing. The slide mechanism enables the cover to slide over the housing, opening or closing the portable electronic device.

Slide mechanisms for slide-type portable electronic devices will often include a linear spring. The linear spring is typically too small to provide sufficient compression for the portable electronic devices. The linear spring is also weaker, so it easily fails with repeated use. Another known structure requires the assembly of a plurality of linear springs together, and is fixed at two ends by bushings. The manufacture and assembly steps are more complicated and time consuming.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
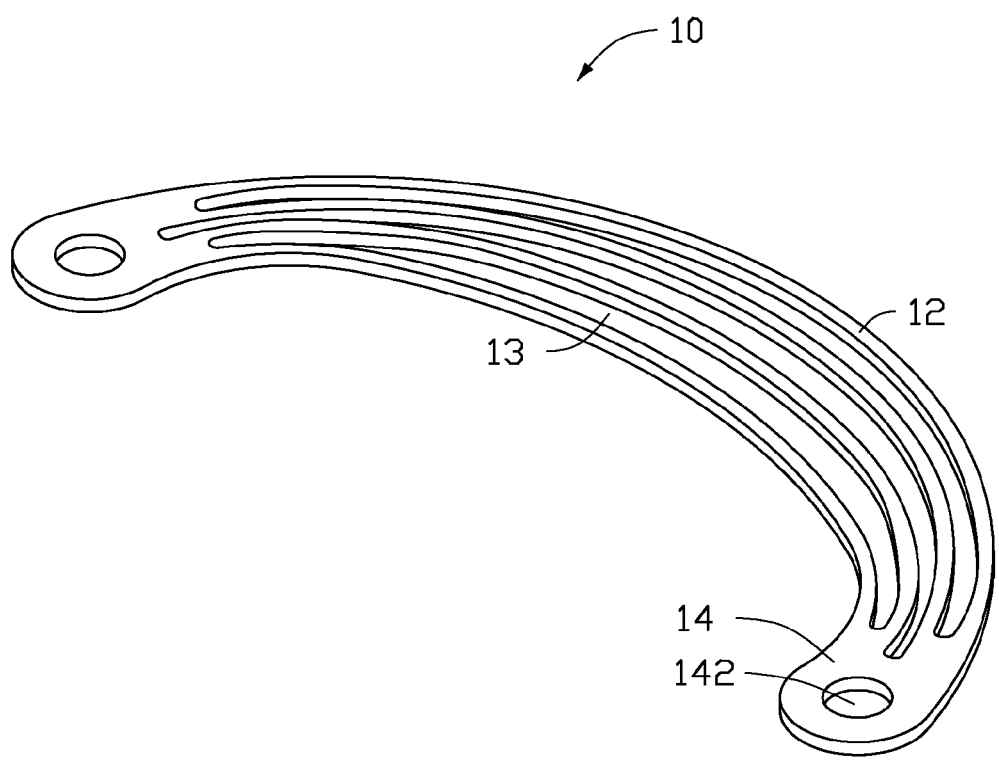
FIG. 1 is an isometric view of an elastic module according to an exemplary embodiment.

FIG. 1 shows an exemplary embodiment of an elastic module 10 which can be used in a slide mechanism of a portable electronic device such as mobile phone, or personal digital assistant.

The elastic module 10 includes an elastic element. The elastic element 10 includes top and bottom surfaces, and two opposite connecting ends 14. The elastic element 10 defines a plurality of arcuate slots 13 on the top and bottom surfaces between the connecting ends 14, thereby forming a plurality of linear springs 12. In this exemplary embodiment, the elastic element 10 defines three arcuate slots 13, and forms four linear springs 12. Each spring 12 is arcuate and has a varying degree of curvature. The springs 12 are substantially coplanar on the top and bottom surfaces and converge at the connecting ends 14. In this embodiment, each spring 12 is made of metal and has a rectangular or rhombic cross-section, for example. Each connecting portion 14 defines a through hole 142 for being connected to a slide mechanism.

The elastic element can be formed by, for example chemical etching or punching. The erosion process removes material by chemical reaction at a desired position on a metal sheet. In the punch process, the elastic element is cut to define the slots 13 and the springs 12. The above processes of producing an integral type elastic element, i.e., formed from a unitary piece of material, have simple processes and simplify manufacture of the elastic element and can save time and money over other processes.

Figure 2:
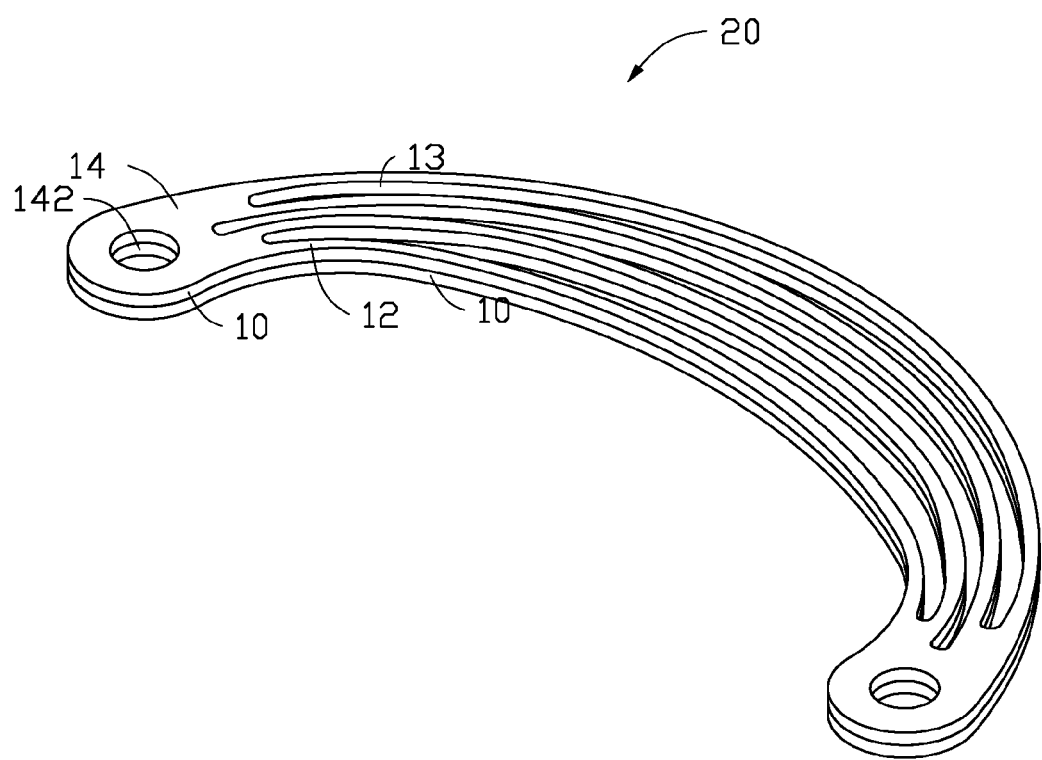
FIG. 2 is an isometric view of an elastic module according to another exemplary embodiment.

FIG. 2 shows another exemplary embodiment of an elastic module 20. The elastic module 20 includes a plurality of stacked elastic elements 10. The elastic elements 10 can be fused together by laser. In this embodiment, since the elastic module 20 includes stacked elastic elements 10, a thickness of each elastic element 10 may be thinner. For thinner elastic elements, the punch process is more suitable. The manufacture of the elements 10 is simpler in this way.

Figure 3:
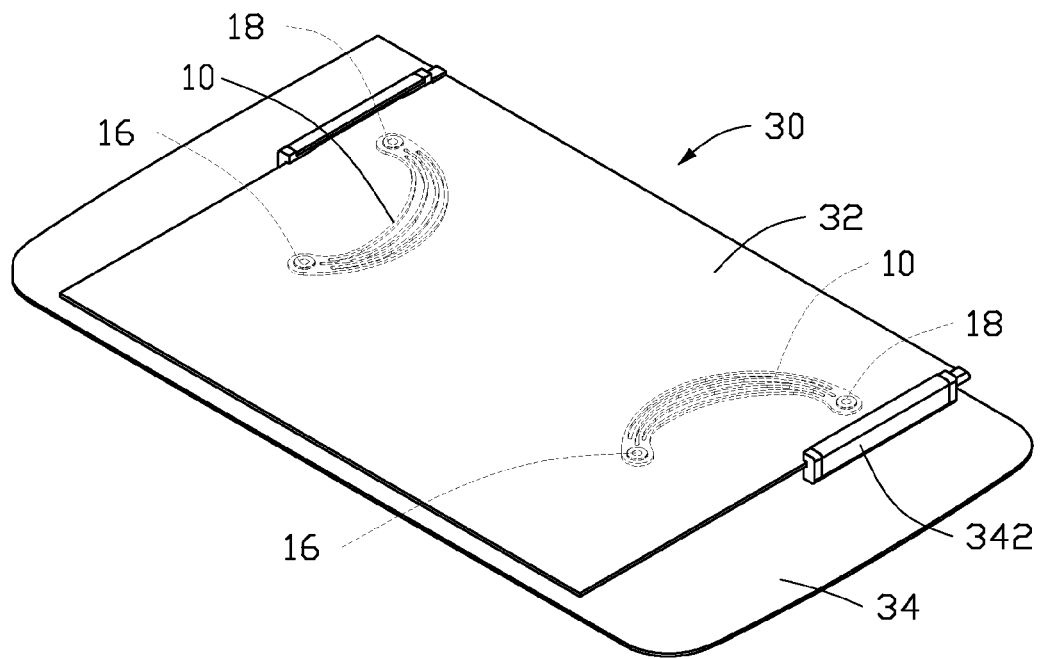
FIG. 3 is a schematic view of a slide mechanism using the elastic modules shown in FIG. 1 in closed position.
Figure 4:
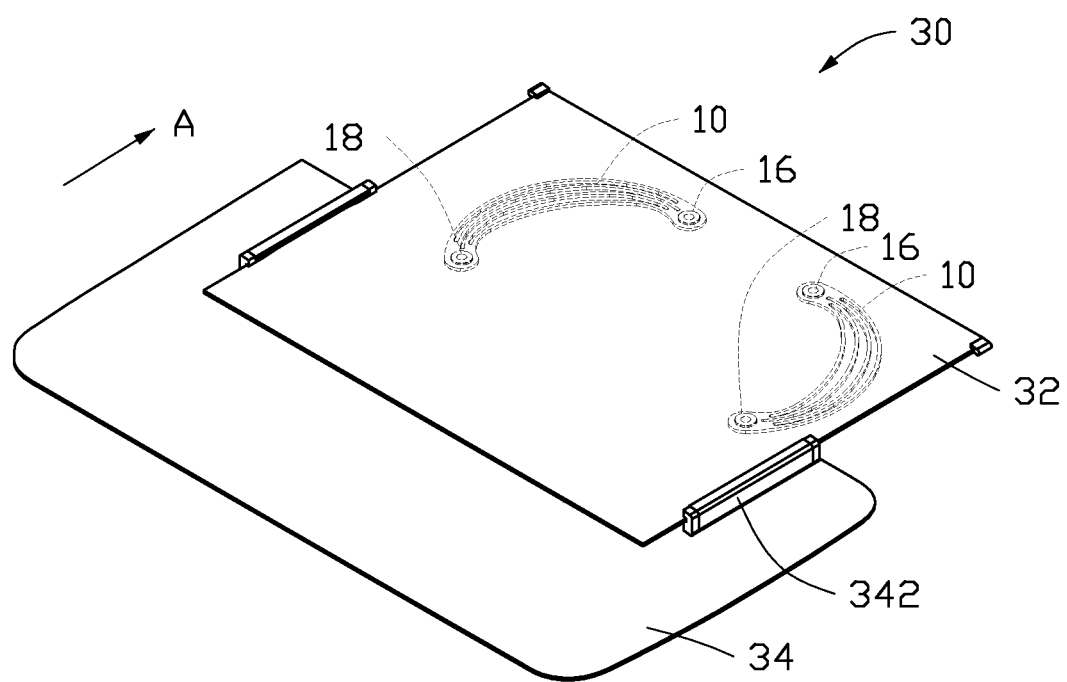
FIG. 4 is a schematic view of the slide mechanism shown in FIG. 3 in open position.

Referring to FIGS. 3 and 4, the elastic module 10 is applied to a slide mechanism 30. The slide mechanism 30 includes an upper plate 32, a lower plate 34 and two elastic modules 10. The upper plate 32 is connected to one of the connecting ends 14 of each elastic module 10 by a first shaft member 16. The lower plate 34 is connected to the other connecting portion 14 of each elastic module 10 by a second shaft member 18. The lower plate 34 also forms two parallel rails 342 for slidably engaging with two sides of the lower plate 34.

To assemble the slide mechanism 30, the two sides of the upper plate 32 engage with the two rails 342 of the lower plate 34. The two elastic modules 10 are assembled between the upper plate 32 and the lower plate 34.

When subjected to an external force, the upper plate 32 slides along direction A shown in FIG. 4. The linear springs 12 of the elastic module 10 compress and accumulate potential energy. After the upper plate 32 slides over a predetermined position, the linear springs 12 release the potential energy, and the upper plate 32 slides automatically until the slide mechanism 30 opens. During this course, the linear springs 12 restore to their original states.

Figure 5:
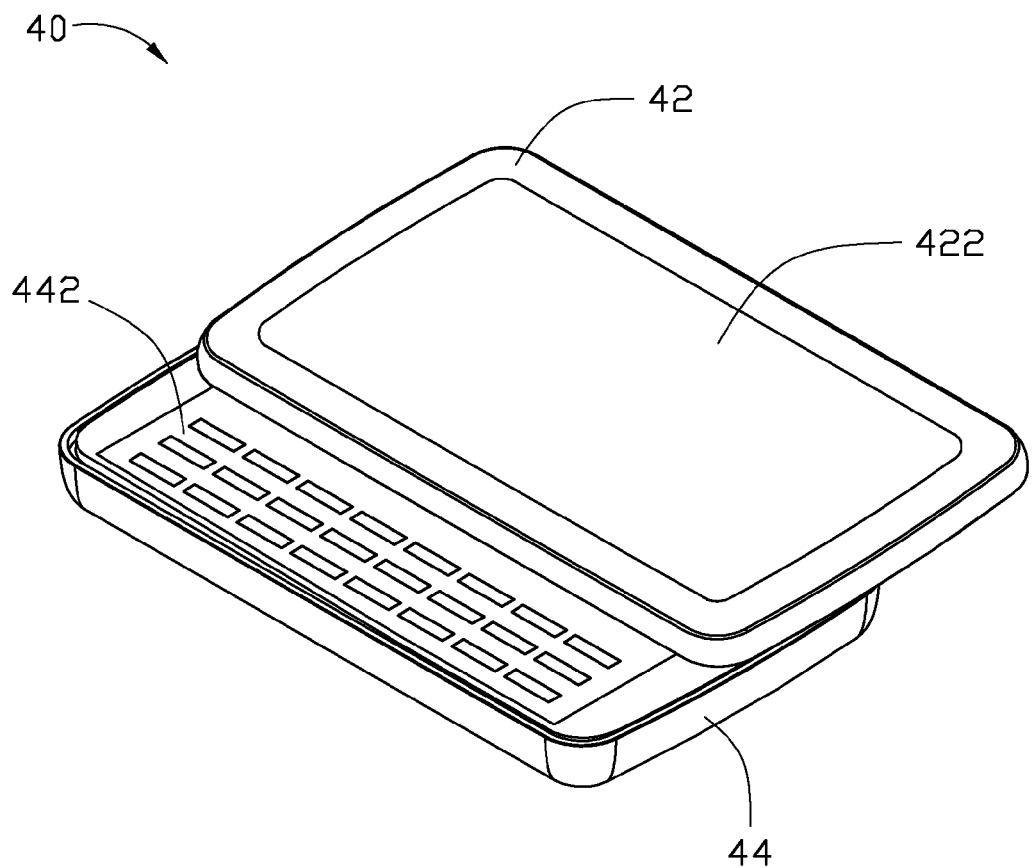
FIG. 5 is a schematic view of a portable electronic device using the slide mechanism shown in FIG. 3.

Referring to FIG. 5, the slide mechanism 30 is applied in a portable electronic device 40 such as a mobile phone. The electronic device 40 includes a cover 42 and a housing 44 engageable with the cover 42. The cover 42 forms a display screen 422, the housing 44 has a plurality of keys 442 arranged thereon. The cover 42 is secured to the upper plate 32, and the housing 44 is secured to the lower plate 34. Thus, the portable electronic device 40 opens or closes with the slide mechanism 30.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An elastic module for a slide mechanism, comprising:
a plurality of elastic elements, each elastic element made of a planar sheet having at least one planar surface, the plurality of elastic elements stacked on each other by resting the planar surface of one planar sheet on the planar surface of adjacent planar sheet, each elastic element including a through hole formed through each of two flat ends of the planar sheet, each elastic element having material removed from its planar sheet to define a plurality of arcuate slots, the remaining material of the planar sheet forming a plurality of springs, and the springs being substantially coplanar with the planar surfaces of the corresponding planar sheet;

wherein distal ends of each spring converge in the flat ends of the planar sheet defining the through holes.

2. The elastic module as claimed in claim 1, wherein each spring is arcuate, and has a different degree of curvature, and each through hole is positioned between the distal ends of the outermost and innermost springs.

3. The elastic module as claimed in claim 1, wherein each elastic element is formed from a unitary metal piece of material by chemical etching or punching.

4. An electronic device, comprising:
a cover;
  a housing;
a slide mechanism comprising:
  an upper plate secured to the cover;
    a lower plate secured to the housing;
      an elastic module connecting to the upper plate and the lower plate;

wherein the elastic module includes a plurality of elastic elements, each elastic element made of a planar sheet having at least one planar surface, the plurality of elastic elements stacked on each other by resting the planar surface of one planar sheet on the planar surface of adjacent planar sheet, each elastic element including a through hole formed through each of two flat ends of the planar sheet, each elastic element having material removed from its planar sheet to define a plurality of arcuate slots, the remaining material of the planar sheet forming a plurality of springs, the springs are substantially coplanar with the planar surfaces of the corresponding planar sheet;

wherein distal ends of each spring converge in the flat ends of the planar sheet defining the through holes.

5. The electronic device as claimed in claim 4, wherein each elastic element is formed from a unitary metal piece of material.

* * * * *